UNITED STATES PATENT OFFICE.

JOHN THOMAS HAMILTON, OF HARTFORD CITY, INDIANA.

MACHINE FOR THE MANUFACTURE OF SHEET-GLASS.

No. 822,446.   Specification of Letters Patent.   Patented June 5, 1906.

Application filed May 26, 1905. Serial No. 262,516.

*To all whom it may concern:*

Be it known that I, JOHN THOMAS HAMILTON, a citizen of the United States, residing at Hartford City, in the county of Blackford, State of Indiana, have invented new and useful Improvements in Machines for the Manufacture of Sheet-Glass, of which the following is a specification.

This machine is one of that kind in which a sheet of glass is drawn from a tank or pot by means of a bait-bar which is lowered into the pot from above and is then lifted, with the glass attached thereto, drawing out a sheet from the pot. This sheet as it is drawn out is cooled and solidified by means of an air-blast delivered against both sides of the sheet. Improved means are provided for manipulating the air-pipes, so as to properly position them as to the sheet of glass.

The invention is illustrated in the accompanying drawings, in which—

Figure 1:
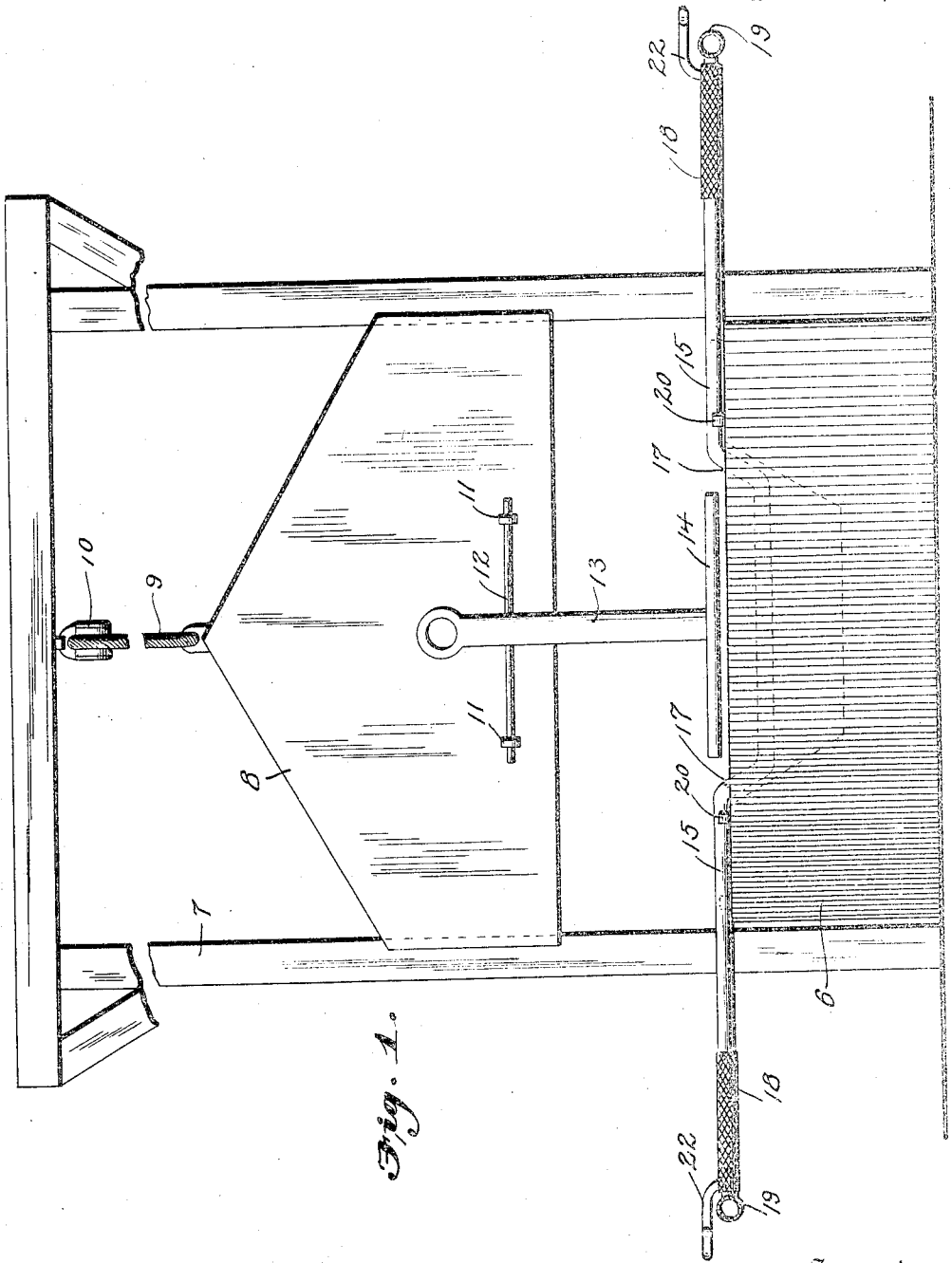
Figure 2:
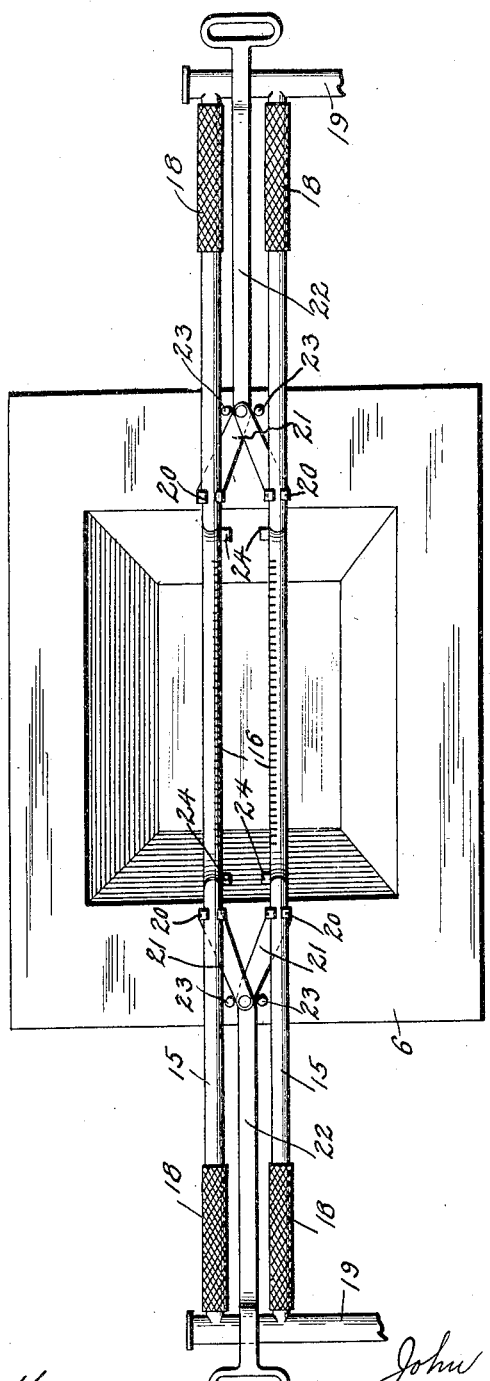

Figure 1 is a side elevation of the apparatus. Fig. 2 is a plan view of the glass-pot and the air-pipes.

Referring specifically to the drawings, 6 indicates the glass tank or pot in which a quantity of molten glass is placed. Standing beside and above the pot is a framework 7, in which slides a cross piece or plate 8, raised or lowered by a rope 9, connected thereto and which passes over a pulley 10 to any suitable source of power. The plate 8 has on its side or face hooks 11, in which may be hung the cross-bar 12 of the stem or rod 13, at the lower end of which is the bait-bar 14, so that the bait-bar is hung upon the vertically-sliding plate. Said bait-bar is preferably a solid round bar of iron and is located directly above the tank 6, into which it may be lowered and from which it may be raised by the means above described. Extending across the tank 6 is a pair of pipes 15. These pipes are parallel and have on their inner sides slits (indicated at 16) through which the blast of air may be discharged. The parts are so positioned that the bait-bar 14 may be raised or lowered between the pipes. Said pipes are dropped, as at 17, to bring them close to the surface of the glass in the tank and at their outer ends are connected by flexible hose 18 to main air-pipes 19, through which a blast may be supplied from any suitable source. The pipes 15 are supported on the ends of the tank in half-collars 20, formed at the ends of branches 21, pivotally connected to handle-rods 22. These rods and branches rest upon the ends of the tank, and located behind the branches are pins or lugs 23. When the handles are pulled out, the branches 21, bearing against the lugs 23, are caused to swing in or together, thus bringing the pipes 15 closer together, and the opposite action takes place when the handle-rods are pushed in. In order to prevent the pipes coming too close together and thus coming in contact with a sheet of glass, they have lugs 24 opposite each other, and these lugs come in contact and stop the movement of the pipes toward each other.

In the operation of the machine the charge of glass is placed in the tank and allowed to cool a little. The bait-bar 14 is then lowered into the same between the pipes 15. The glass adheres to said bar, which is then lifted, drawing up a sheet of glass from the tank. At the same time the air-blast is turned on, cooling the sheet as it is drawn out. In order to regulate the strength of the blast, and consequently the thickness of the sheet, the pipes 15 may be placed closer to or farther from the sheet by manipulation of the handles 22. After the sheet is started it will usually be necessary to bring the air-pipes 15 closer thereto, so as to cool the same rapidly and prevent separation of the sheet and to permit it to be drawn up faster, holding it to a uniform thickness. When fully drawn, the sheet is cut off near the pot and removed.

What I claim as new, and desire to secure by Letters Patent, is—

In an apparatus for making sheet-glass, the combination with a tank and means for drawing a sheet of glass therefrom, of a pair of air-pipes between which the sheet is drawn and adapted to deliver a cooling-blast thereto, said air-pipes being connected to a flexible hose, and handles having pivoted branches connected to opposite ends of the pipe and movable in or out to move the pipes toward or from each other, the tank having projections which engage the branches when the handles are moved in or out and swing the same to or from each other.

JOHN THOMAS HAMILTON.

Witnesses:
WILLIAM B. ABBOTT,
FRANK HAMILTON.